United States Patent [19]

Martin, Sr.

[11] 4,202,077
[45] May 13, 1980

[54] CRAB PEELER

[76] Inventor: Harry M. Martin, Sr., Rte. 1, P.O. Box 450, Paulina, La. 70763

[21] Appl. No.: 911,896

[22] Filed: Jun. 2, 1978

[51] Int. Cl.² .............................................. A22C 29/02
[52] U.S. Cl. .......................................... 17/73; 17/48; 241/89.4
[58] Field of Search .......................... 17/71, 73, 53, 48; 241/89.4

[56] References Cited

U.S. PATENT DOCUMENTS

| | | | |
|---|---|---|---|
| 2,987,759 | 6/1961 | Lapeyre et al. | 17/73 |
| 3,135,015 | 6/1964 | Martinez | 17/73 |
| 3,921,256 | 11/1975 | Huebotter | 17/71 |

Primary Examiner—Z. R. Bilinsky
Attorney, Agent, or Firm—Stevens, Davis, Miller & Mosher

[57] ABSTRACT

Crab meat is removed from cooked crabs by placing the cooked crabs on a platform and then subjecting them to an increasing, almost vertical, pressure by passing a convex surface over them. The meat is thereby expressed from the peel and falls into a receptacle. The peel adheres to the convex surface to be scraped off and away by a scraping blade.

5 Claims, 8 Drawing Figures

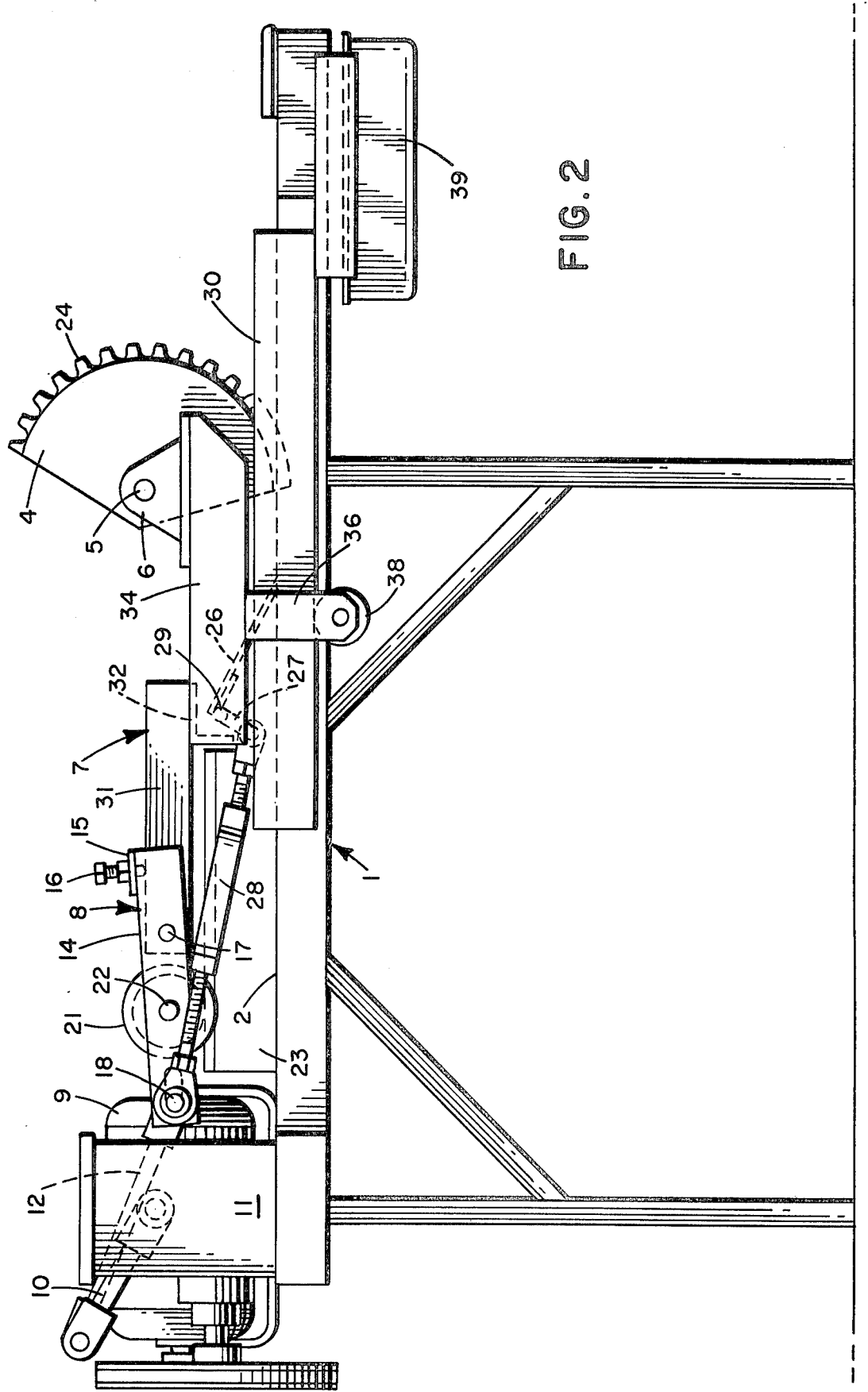

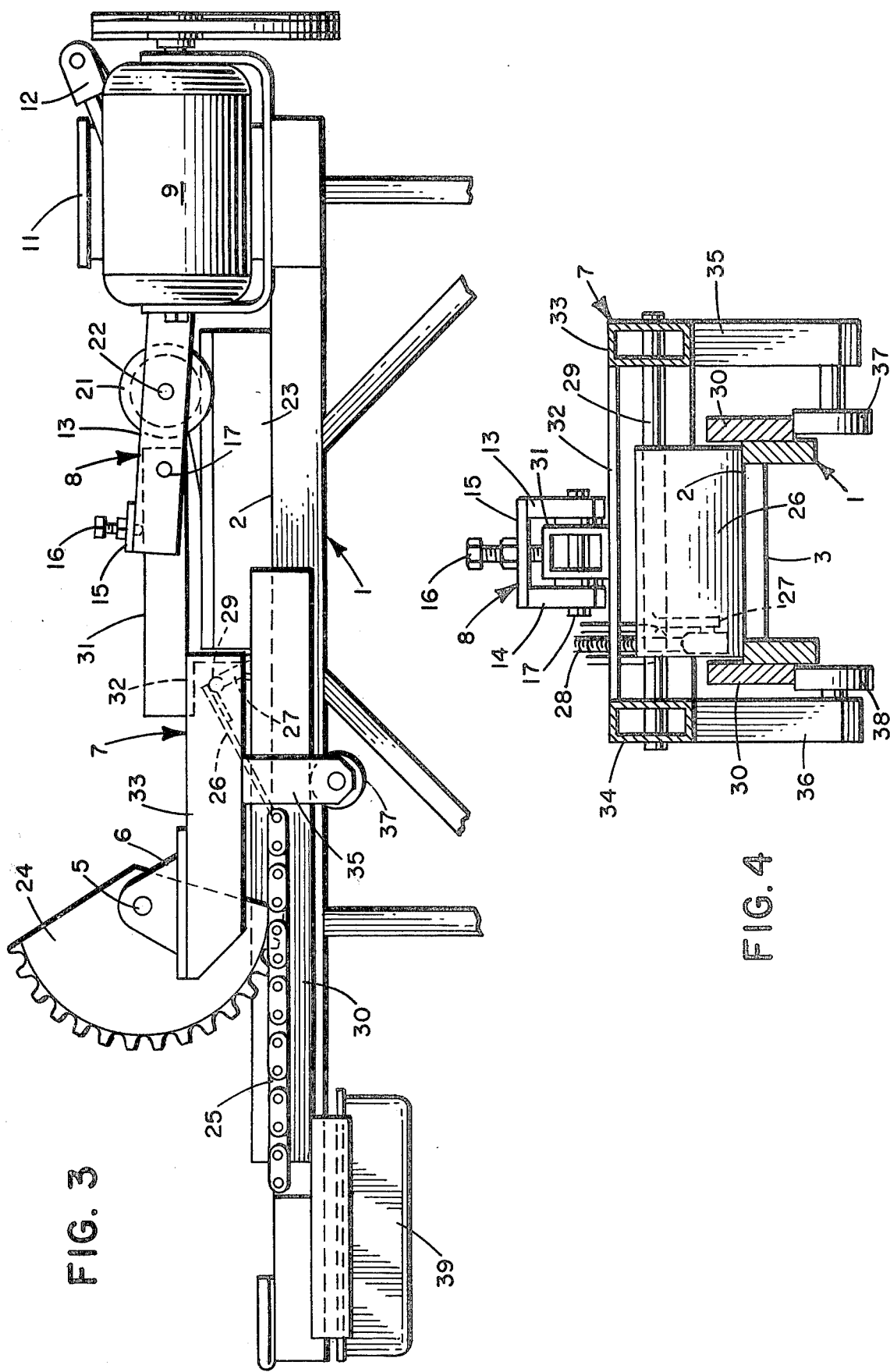

CRAB PEELER

My invention relates to apparatus and method for removing meat from crabs, and may be useful for similar products.

Crab meat is an important food. Removing the crab meat from the crab presents great difficulties, however. Peeling crab by hand is a slow and expensive process. A mechanical crab peeler has long been sought, but efforts have resulted in devices which were either too expensive or did not perform properly. Many of these machines tend to mash the meat, producing a mushy and fine end product.

It is an object of my invention to provide a mechanical device which can efficiently peel crabs, and which will produce crab meat which is whole and firm. This object is accomplished in my invention by passing a convex surface, such as a semicylindrical roller, over the crabs as they lay on a platform to create a nearly vertical increasing pressure on the crabs to express crab meat from the peel.

FIG. 2 is a side view of the embodiment of FIG. 1;

FIG. 3 is a view of the embodiment of FIG. 1 from the side opposite that in FIG. 2;

FIG. 4 is a cross-section view of the embodiment of FIG. 1, taken along line 4—4 of FIG. 1;

DETAILED DESCRIPTION

Figure 1:
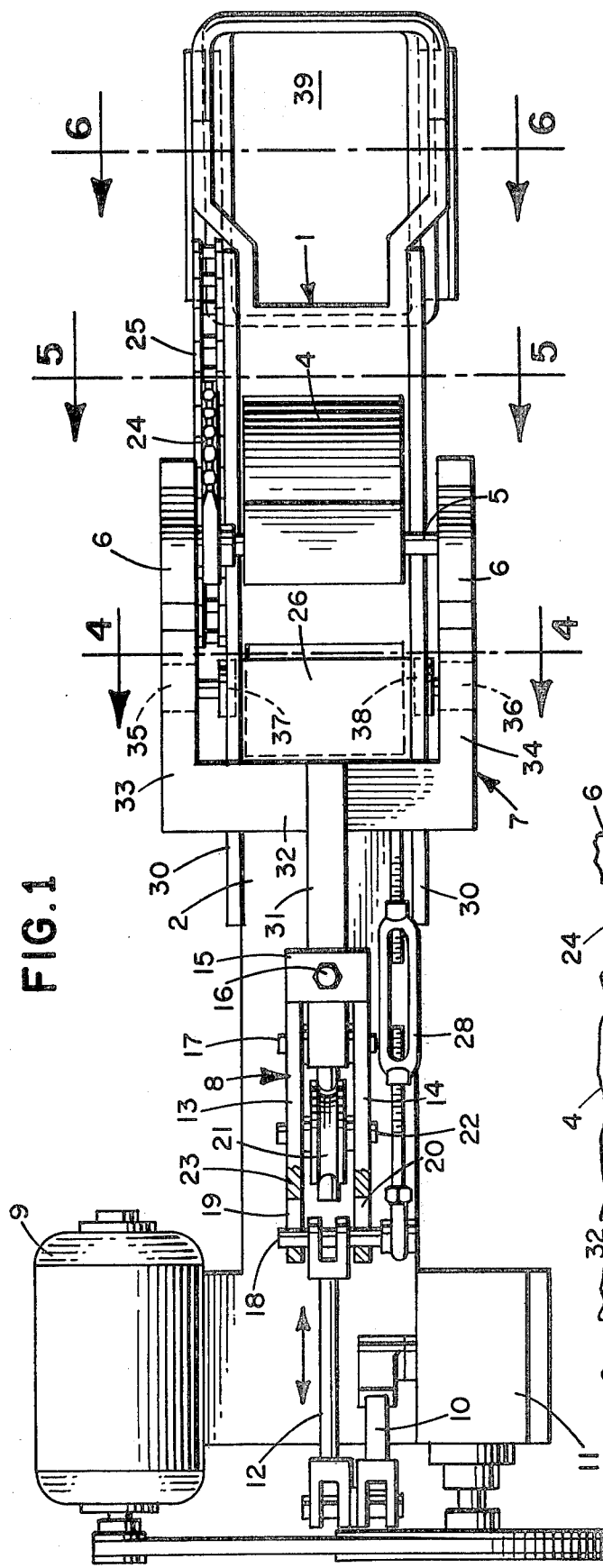
FIG. 1 is a top view of a preferred embodiment of my invention.
Figure 6:
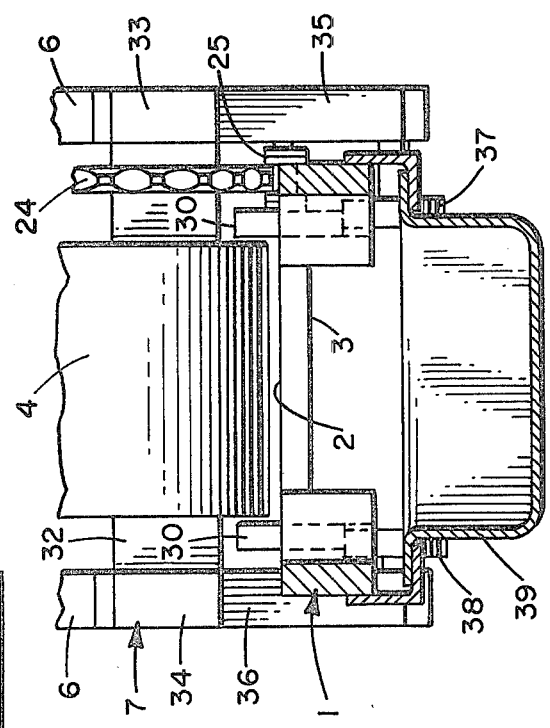
FIG. 6 is a cross-section view of the embodiment of FIG. 1, taken along line 6—6 of FIG. 1.
Figure 5:
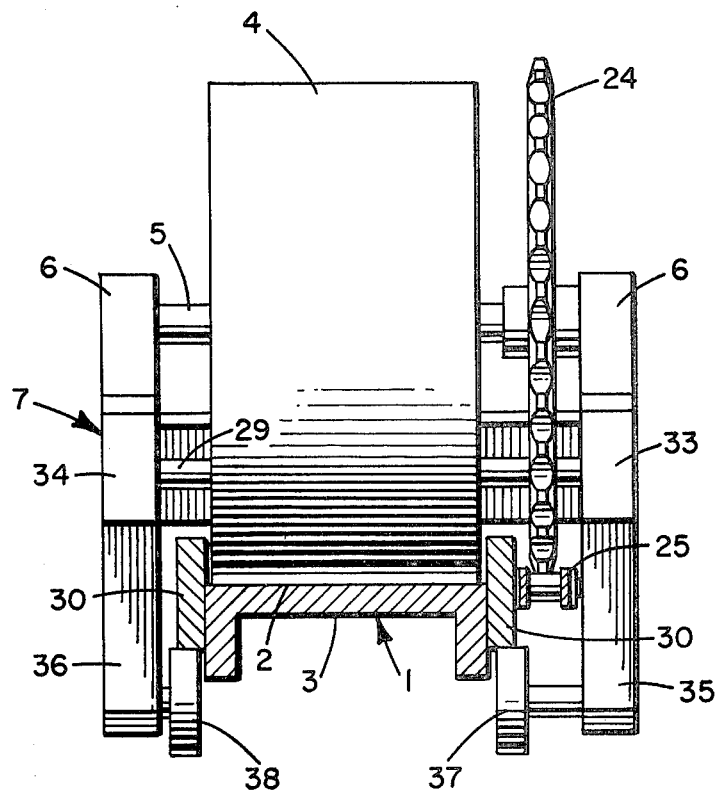
FIG. 5 is a cross-section view of the embodiment of FIG. 1, taken along line 5—5 of FIG. 1.

In the present invention, crab meat is removed from previously cooked crabs by placing the cooked crabs on a platform and then using a convex surface to apply an increasing, almost vertical, pressure to the crabs to express the crab meat from the peel. The expressed meat falls into a meat receptacle at one end of the platform; the peels adhere to the convex surface and are scraped therefrom and off the other end of the platform by a blade.

The drawings illustrate a preferred embodiment of the present invention. Referring now to FIGS. 1-6, it can be seen that the platform 1 has a top surface 2 and a bottom surface 3. A convex surface is provided by roller 4 which is disposed so as to be able to roll along the top surface 2 of platform 1. In the preferred embodiment, the convex surface is a section of a cylindrical surface, and subtends an arc angle of about 180°. The convex surface may, however, define an entire cylindrical surface or any other surface not inconsistent with the application of pressure to the top surface 2 by rolling action. Thus, a full cylindrical roller could be used in my invention. Roller 4 is made of metal but other materials may also be suitable.

It is desirable that the angle of contact between the platform 1 and the roller 4 be small in order to allow the roller 4 to apply an almost vertical pressure on the crabs which gradually increases as the roller 4 advances over them. It is clear that the angle of contact between the platform 1 and roller 4 varies inversely with the radius of roller 4 so that a large radius will produce a small angle of contact. In the preferred embodiment, a radius of 5 inches has been found satisfactory, but it is clear that other radii may be chosen.

In the preferred embodiment, the roller 4 is supported through its center by an axle 5 resting in bearings 6. The bearings 6 are mounted on a drive frame 7 which is mounted to reciprocate in a plane parallel to, but above, the plane defined by the platform 1. Drive frame 7 includes a tongue member 31, cross bar member 32 and fork members 33 and 34. Rigidly depending from fork members 33 and 34 are arm members 35 and 36. Pressure rollers 37 and 38 are mounted on arm members 35 and 36 so as to be able to roll along guide rails 30 affixed to each side of platform 1; they serve to restrain any upward movement of roller 4.

By its reciprocation, drive frame 7 drives the roller 4 through its bearings 6 back and forth along the top surface 2 of platform 1. Reciprocating thrust for the drive frame 7 is provided by drive means through a yoke 8. In the preferred embodiment, the drive means comprises an electric motor 9, the rotating shaft of which imparts its rotary motion to crank 10 through gear box 11 by which the rpm of crank 10 may be adjusted. Crank 10 is connected to a connecting rod 12 for converting the rotary motion of crank 10 to back and forth reciprocating motion in the manner well known to those of ordinary skill in the mechanical arts. It will be clearly understood, however, that any means which can impart reciprocal back and forth motion would be suitable as drive means for my invention. For example, the electric motor 9 and gear box 11 could be replaced by manually operated means to impart rotary motion to crank 10. As another example, a gasoline engine may be substituted for electric motor 9.

The reciprocating back and forth movement of connecting rod 12 is transmitted to drive frame 7 (and thus to roller 4) by yoke 8. Yoke 8 is comprised of a frame having sides 13 and 14 and crosspiece 15. In crosspiece 15 is a hole threaded to receive threaded bolt 16, the end of which contacts tongue 31 of drive frame 7. By adjusting bolt 16, the pressure of roller 4 on the top surface 2 of platform 1 may be adjusted. Yoke 8 is connecting to drive frame 7 by pin 17 which passes through receiving holes in sides 13 and 14. Yoke 8 is connected to connecting rod 12 by another pin 18 which passes through horizontal slots 19 and 20 in sides 13 and 14. The length of slots 19 and 20 is substantially greater than the diameter of pin 18. It is pin 18 which actually transmits the reciprocating back and forth movement of connecting rod 12 to yoke 8. However, such movement is only transmitted when pin 18 engages sides 13 and 14 of yoke 8 at the ends of slots 19 and 20. During the time that pin 18 travels back and forth between the ends of slots 19 and 20, it is not engaged with sides 13 and 14 and none of the reciprocating back and forth motion of connecting rod 12 is then transmitted to yoke 8. Pin 18 is then said to be exhibiting lost motion, since its motion is lost as regards its ability to transmit its motion to yoke 8.

In the preferred embodiment, a guide wheel 21 is located between sides 13 and 14 and pins 17 and 18. The guide wheel 21 is connected through its axis of rotation to yoke 8 by pin 22 which passes through receiving holes in sides 13 and 14. The diameter of guide wheel 21 exceeds the width of sides 13 and 14, thus permitting it to engage guide rail 23. Guide rail 23 is fixed with respect to roller 4, but is aligned in the direction of its advance. The back and forth movement of the guide wheel 21 along guide rail 23 in response to the reciprocating back and forth movement of yoke 8 is synchronous with the movement of roller 4 and ensures the precision and accuracy of its back and forth movement.

To ensure roller 4 from slipping during its back and forth movement (i.e., to ensure that its back and forth movement is achieved by rolling and not sliding), there is rigidly fixed to the axle 5 of roller 4, a pinion gear 24 which engages a rack 25 which is fixed relative thereto. While the pinion gear 24 of the preferred embodiment is a sectional pinion gear, similar in size and shape to the cross-section of roller 4, it is clear that pinion gears of different size and shape may be employed, just as a full cylindrical roller may be used instead of sectional cylindrical roller 4 of the preferred embodiment. Further, while the rack 25 of the preferred embodiment is of the bicycle chain type, it is clear that other rack types would be suitable.

A feature of the claimed invention is a scraping blade 26 which is connected to yoke 8 by means of a bell crank 27 and a turnbuckle 28. The bell crank 27 is attached through its center to drive frame 7 by a pin 29 and is free to pivot thereabout. To one arm of bell crank 27 is attached one end of turnbuckle 28. The other end of turnbuckle 28 is attached to one end of pin 18. Thus, the turnbuckle 28 partakes of the lost motion movement of pin 18, and when it does so, it causes the bell crank 27 to pivot about pin 29, since pin 29 is attached to drive frame 7 and does not partake of the lost motion movement of pin 18. The turnbuckle 28 and scraping blade 26 are attached to the arms of bell crank 27, the particular arms being so chosen so that when the lost motion movement of pin 18 is in the direction of roller 4, the scraping blade 26 is pivoted upward to ensure contact with the rolling surface of roller 4. This position of scraping blade 26 relative to roller 4 is maintained as roller 4 advances along the top surface 2 of platform 1. (Roller 4 is said to be advancing when it is being pushed by drive frame 7). When the lost motion movement of pin 18 is in the direction away from roller 4, the scraping blade 26 is pivoted downward to ensure scraping contact with the top surface 2 of platform 1. This position of scraping blade 26 relative to the top surfacd 2 of platform 1 is maintained as the roller 4 retreats along the top surface 2 of platform 1. (Roller 4 is said to be retreating when it is being pulled by drive frame 7). Scraping blade 26 thus moves ahead of roller 4 during the retreat of roller 4, scraping the top surface 2 of platform 1 as it so moves.

Figure 7:
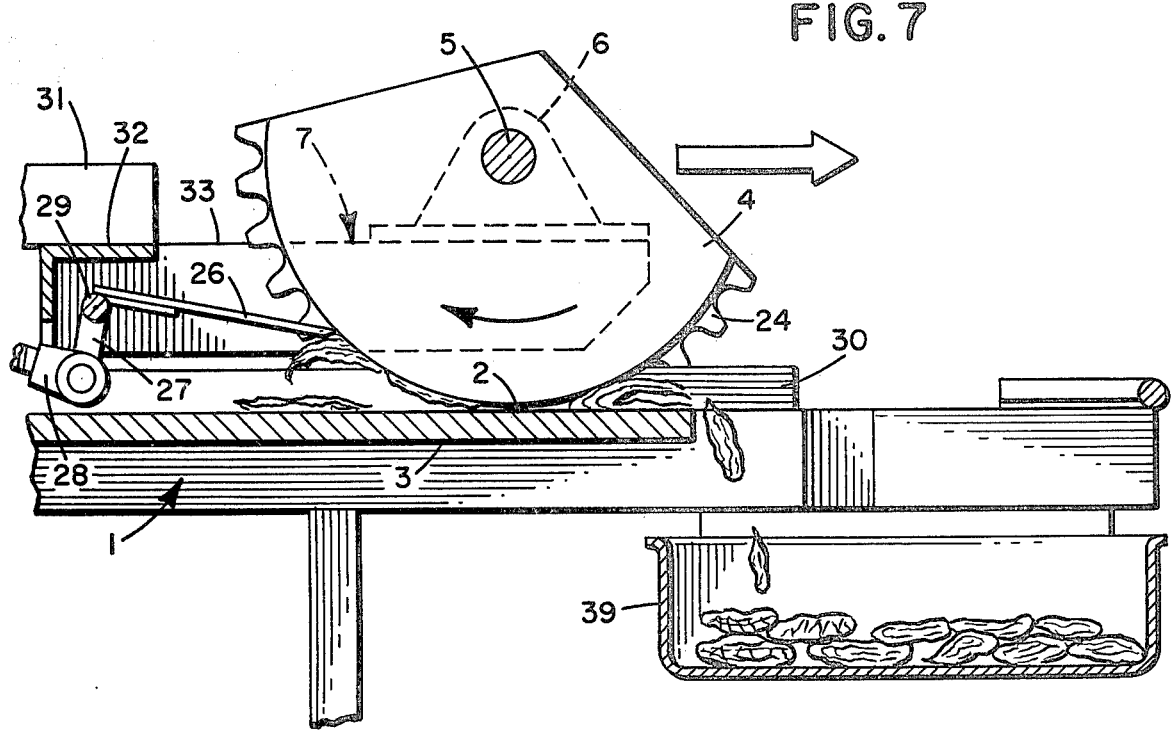
FIG. 7 is a partial cross-section of the embodiment of FIG. 1, taken along its length, to illustrate its operation.
Figure 8:
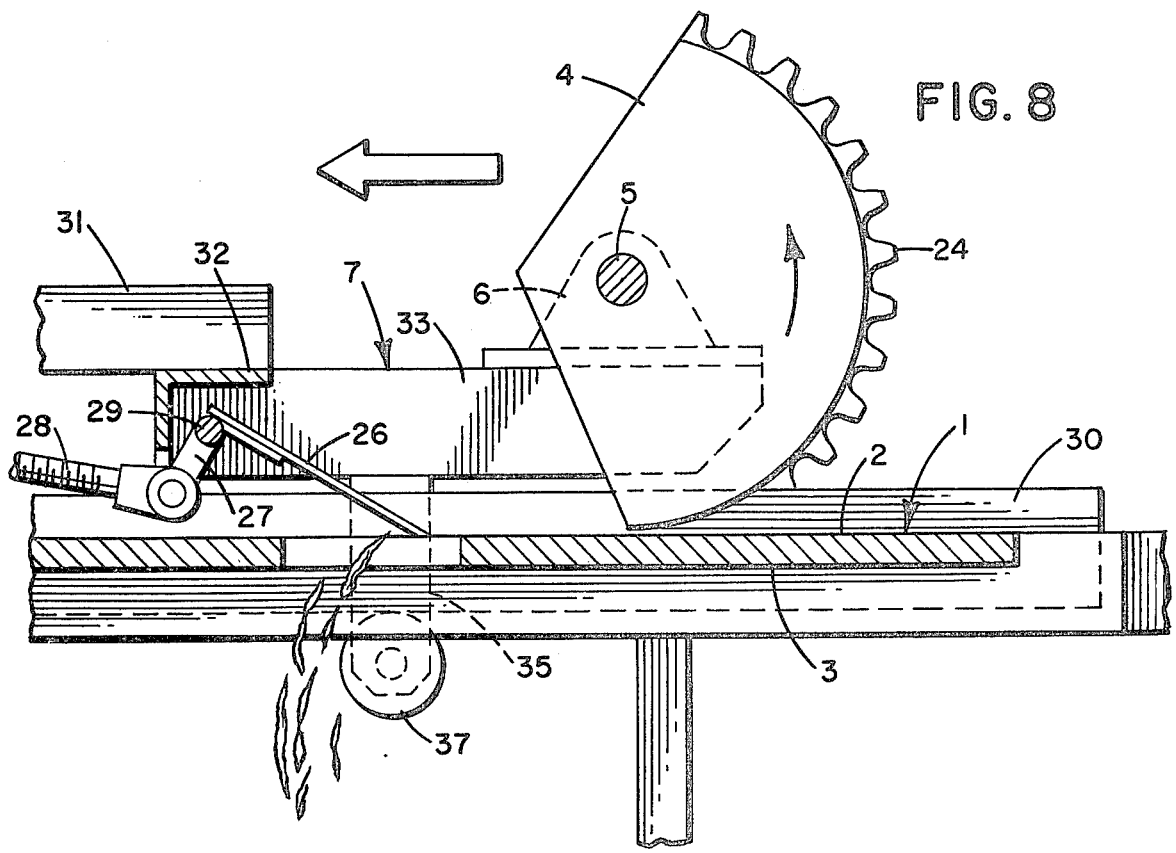
FIG. 8 is another partial cross-section of the embodiment of FIG. 1, taken along its length, to further illustrate its operation.

The operation of the machine may be understood by referring to FIGS. 7 and 8. In FIG. 7, clean halves of par-boiled crabs (outer shell and intestines removed) have been placed on the top surface 2 of platform 1 along the path on which the roler 4 will advance when pushed by drive frame 7. As roller 4 is pushed by drive frame 7, it rolls forward to apply an increasing and almost vertical pressure to the cooked crabs as it passes over them which results in the meat being squeezed or expressed from the crab peels. The meat falls into a receptacle 39 at the end of platform 1. The crab peels adhere to the surface of roller 4 and are scraped onto the top surface 2 of platform 1 by scraping blade 26. Scraping blade 26, was of course, in scraping position with respect to roller 4 before it began its advance, due to the lost motion movement described above. Having expressed the crab meat in FIG. 8, the roller 4 retreats, as illustrated in FIG. 8. In FIG. 8, roller 4 is pulled back by drive frame 7, the lost motion movement having already placed scraping blade 26 in scraping position with respect to the top surface of platform 1. Scraping blade 26 then moves ahead of roller 4, scraping the peels off the end of platform opposite the end associated with the meat receptacle 39. Once cycle of operation is thus complete and the machine is now ready to receive more cooked crabs to begin another cycle.

As mentioned earlier, the pressure of roller 4 on the top surface 2 of platform 1 may be adjusted by adjusting threaded bolt 16. If the bolt 16 is turned so as to raise crosspiece 15 relative to the tongue 31, the yoke 8 (or to be more precise, the sides 13,14 of yoke 8) will pivot in an anti-clockwise direction about axle 22, as can be visualized in FIG. 2, thereby tending to lower pin 18 and raise pin 17. This movement causes tongue 31 to be lifted in a clockwise direction about pressure rollers 37 and 38, thus lowering roller 4, and increasing the pressure of roller 4 against the top surface 2 of platform 1.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. A device for recovering crab meat from previously cooked crabs comprising:
   a platform for receiving a quantity of crabs, one end of said platform being the peel end, the other end of said platform being the meat end;
   means defining a convex surface;
   means mounting said convex surface defining means for rolling movement back and forth along the top surface of said platform;
   drive means;
   means connecting said convex surface mounting means with said drive means;
   a scraping blade located between said convex surface defining means and said peel end;
   means mounting said blade to cause said blade to move back and forth from a position scraping the rolling surface of said convex surface defining means and a position scraping the top surface of said platform in the direction of said peel end, said blade being in a position scraping the rolling surface of said convex surface defining means when said convex surface defining means is rolling along the top surface of said platform in the direction of said meat end, but being in a position scrap- the top surface of said platform in the direction of said peel end when said convex surface defining means is rolling along the top surface of said platform in the direction of said peel end.

2. A device for recovering crab meat from previously cooked crabs as in claim 1, wherein:
   said drive means transmits reciprocatory back-and-forth motion to said connecting means by a connecting rod, said connecting means and said connecting rod having holes by which they are connected by a pin, the diameter of said pin being comparable in size with that of the hole in said connecting rod but substantially smaller in horizontal diameter than the hole in said connecting means so that said pin exhibits lost motion when moved back and forth in the hole in said connecting means by the reciprocating motion of said rod;

and wherein there is provided means connecting said blade to said pin, which connecting means comprises a bell crank type means and turnbuckle means, one arm of said bell crank being attached to said blade, the other arm of said bell crank being attached to one end of said turnbuckle means, the other end of said turnbuckle means being attached to said pin so that when said pin exhibits lost motion in the direction of said meat end, said blade is moved to a scraping position with respect to said convex surface defining means which is maintained until said pin exhibits lost motion in the direction of said peel end, whereupon said blade is moved to a position scraping the top surface of said platform in the direction of said peel end.

3. A device for recovering crab meat from previously cooked crabs as in claim 1, wherein said convex surface mounting means includes
   pinion means fixed to said convex surface defining means; and
   rack means engaging said pinion means, siad rack means being fixed to said platform.

4. A device for recovering crab meat from previously cooked crabs as in claim 1, wherein said convex surface mounting means includes pressure roller means, whereby pressure rollers are in rolling contact with guide rails affixed to the side of said platform to prevent upward movement by said convex surface defining means.

5. A device for recovering crab meat from previously cooked crabs as in claim 1, wherein there is also provided means for adjusting the pressure applied by said convex surface defining means.

* * * * *